US008791942B2

(12) United States Patent
Rivers et al.

(10) Patent No.: US 8,791,942 B2
(45) Date of Patent: Jul. 29, 2014

(54) COMPUTER METHOD AND APPARATUS FOR ROTATING 2D CARTOONS USING 2.5D CARTOON MODELS

(75) Inventors: Alec Rivers, Los Angeles, CA (US); Frederic Durand, Boston, MA (US)

(73) Assignee: Massachusetts Institute of Technology, Cambride, MA (US)

( * ) Notice: Subject to any disclaimer, the term of this patent is extended or adjusted under 35 U.S.C. 154(b) by 558 days.

(21) Appl. No.: 12/889,937

(22) Filed: Sep. 24, 2010

(65) Prior Publication Data

US 2012/0075284 A1 Mar. 29, 2012

(51) Int. Cl.
*G06T 15/00* (2011.01)

(52) U.S. Cl.
USPC .......................................... 345/419; 345/473

(58) Field of Classification Search
USPC .................. 345/419–427, 473–475
See application file for complete search history.

(56) References Cited

U.S. PATENT DOCUMENTS 5,734,384 A * 3/1998 Yanof et al. .................... 345/424
8,259,101 B2 * 9/2012 Shimada et al. .............. 345/419

OTHER PUBLICATIONS

Di Fiore et al., Employing Approximate 3D Models to Enrich Traditional Computer Assisted Animation, Proceedings of the Computer Animation 2002.*
Sederberg, T.W., et al., "A Physically Based Approach to 2-D Shape Blending," *Computer Graphics*, 26(2):25-34 (1992).
Eisemann, E., et al., "A Visibility Algorithm for Converting 3D Meshes into Editable 2D Vector Graphics," *ACM Transactions on Graphics (TOG)—Proceedings of ACM Siggraph*, 28(3), 8 pages (2009).
Ngo, T., et al., "Accessible Animation and Customizable Graphics Via Simplicial Configuration Modeling," *Proceedings of SIGGRAPH 2000*, 8 pages (2000).
Sykora, D., et al., "Adding Depth to Cartoons Using Sparse Depth (In)equalities," *Eurographics*, 29(2), 9 pages (2010).
Kowalski, M. A., et al., "Art-Based Rendering of Fur, Grass, and Trees," *Siggraph 99 Conference Proceedings*, pp. 1-6 (1999).
Northrup, J.D., et al., "Artistic Silhouettes: A Hybrid Approach," *Proceedings of NPAR 2000*, pp. 1-7 (2000).
Alexa, M., et al., "As-Rigid-As-Possible Shape Interpolation," *Proceedings of Siggraph 2000*, pp. 157-164 (2000).
Igarashi, T., et al., "As-Rigid-As-Possible Shape Manipulation," *ACM Transactions on Computer Graphics ACM SIGGRAPH 2005*, 24(3):1134-1141 (2005).
Di Fiore, F., et al., "Automatic In-betweening in Computer Assisted Animation by Exploiting 2.5D Modelling Techniques," *Institute of Electrical and Electronics Engineers, Inc.*, pp. 1-9 (2001).

(Continued)

*Primary Examiner* — Xiao Wu
*Assistant Examiner* — Charles Tseng
(74) *Attorney, Agent, or Firm* — Hamilton, Brook, Smith & Reynolds, P.C.

(57) ABSTRACT

Disclosed herein are methods, apparatus, and computer program programs that use 2D drawings of a cartoon in different views to automatically construct rotated views of the subject cartoon. Embodiments involve a novel structure, the 2.5D cartoon model, which can generate plausible renderings of the cartoon in any view. Two or more input drawings can be leveraged to construct a 2.5D cartoon model that supports full 3D rotation. Unlike a 3D model, however, renderings produced by a 2.5D cartoon model retain the 2D nature and hand-drawn appearance of the input drawings, and support a wide range of 2D stylizations and shapes that would be impossible with a 3D model.

20 Claims, 8 Drawing Sheets

(56) References Cited

OTHER PUBLICATIONS

Zeleznik, R. C. et al., "SKETCH: An Interface for Sketching 3D Scenes," *SIGGRAPH '96: Proceedings of the 23rd Annual Conference on Computer Graphics and Interactive Techniques*, pp. 163-170 (1996).

Decaudin, P., "Cartoon-Looking Rendering of 3D-Scenes," *Research Report INRIA #2919*, pp. 1-11 (1996).

Hsu, S.C., et al., "Drawing and Animation Using Skeletal Strokes," *Proceeding SIGGRAPH '94 Proceedings of the 21st Annual Conference on Computer Graphics and Interactive Techniques*, 10 pages (1994).

Bourguignon, D., et al., "Drawing for Illustration and Annotation in 3D," *Eurographics*, 20(3), 9 pages (2001).

Nealen, A., et al., "FiberMesh: Designing Freeform Surfaces with 3D Curves," *ACM Transactions on Computer Graphics, ACM SIGGRAPH 2007*, pp. 1-8 (2007).

McCann, J., et al., "Local Layering," *Proceedings of ACM SIGGRAPH 2009*, 28(3), 7 pages, (2009).

Yonezawa, K., et al., "SiLF: A Sketching Tool for Cartoon-Like Pseudo-3D Illustrations Based on 3D Outlines," *Proceeding SIGGRAPH '04 ACM SIGGRAPH 2004*, 1 pages (2004).

Igarashi, T., et al., "Spatial Keyframing for Performance-Driven Animation," *Eurographics/ACMSiggraph Symposium on Computer Animation*, 9 pages (2005).

Gingold, Y., et al., "Structured Annotations for 2D-to-3D Modeling," *ACM Transactions on Graphics*, 28(5), 10 pages (2009).

Igarashi, T., et al., "Teddy: A Sketching Interface for 3D Freeform Design," *ACM Siggraph 99*, 8 pages (1999).

Seitz, S. M., et al., "View Morphing," *SIGGRAPH '96 Proceedings of the 23rd Annual Conference on Computer Graphics and Interactive Techniques*, 10 pages (1996).

Rademacher, P., "View Dependent Geometry," *Computer Graphics Proceedings, Annual Conference Series*, 8 pages (1999).

Kalnins, R. D., et al., "WYSIWYG NPR: Drawing Strokes Directly on 3D Models," *ACM Transactions on Graphics (Proc. SIGGRAPH)*, 10 pages (2002).

A. Rivers, et al., "2.5D Cartoon Models," *37th International Conference and Exhibition on Computer Graphics and Interactive Techniques*, Jul. 25-29, 2010 Conference, 7 pages (2010).

\* cited by examiner

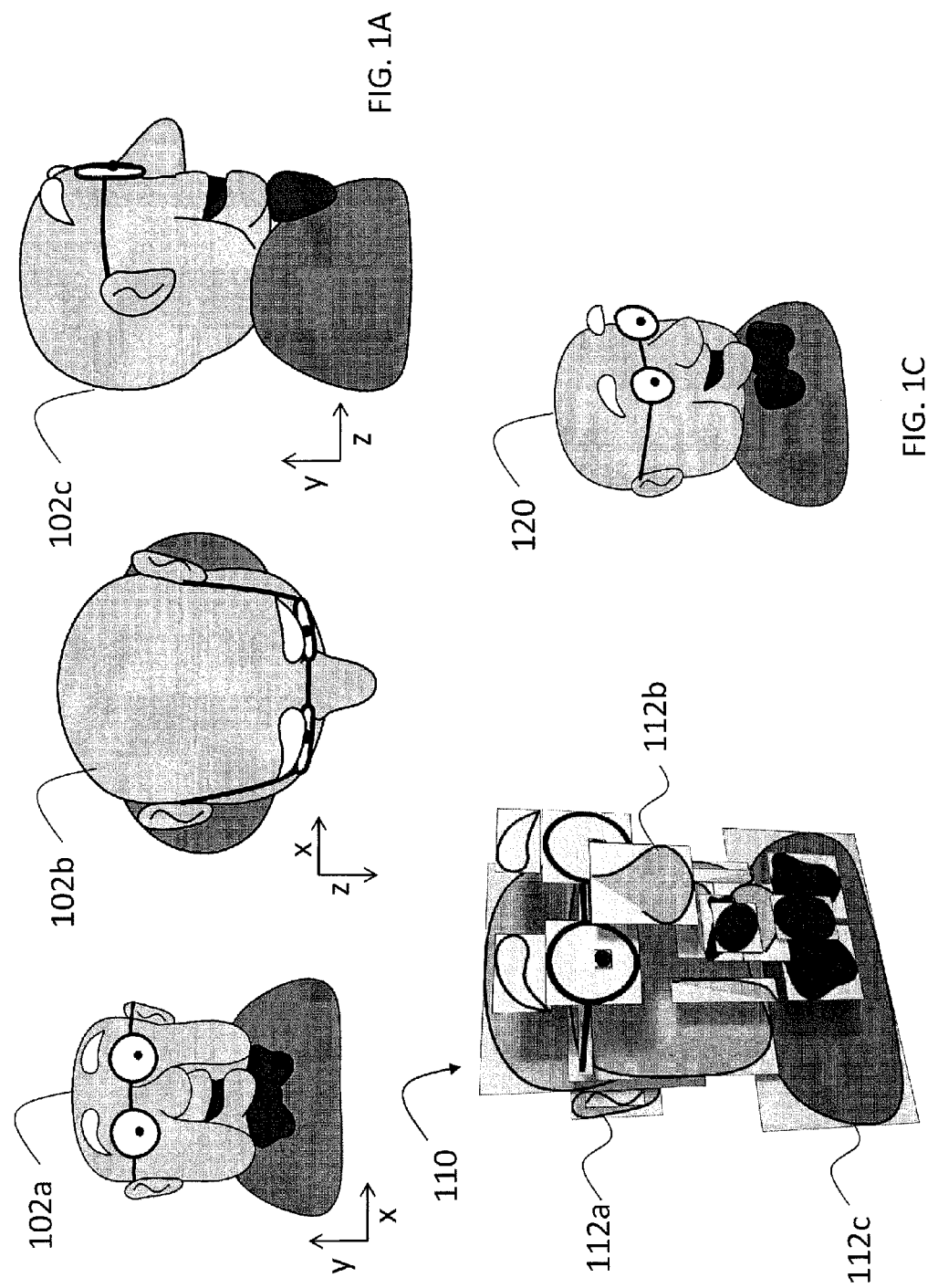

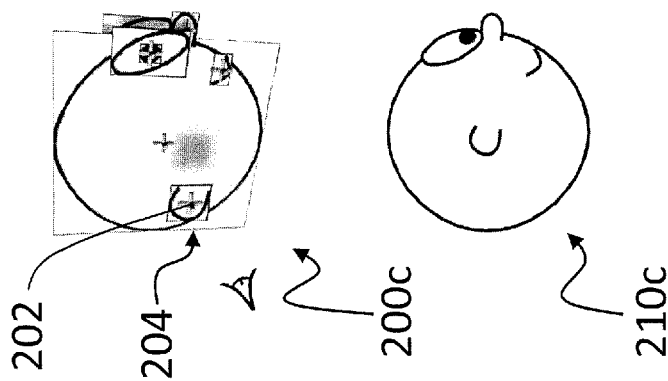
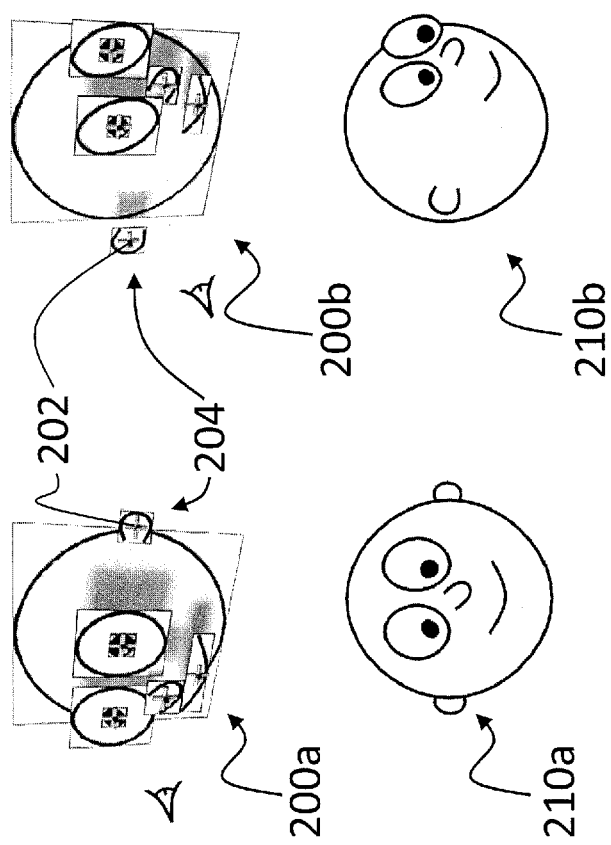
FIG. 2A  FIG. 2B  FIG. 2C

COMPUTER METHOD AND APPARATUS FOR ROTATING 2D CARTOONS USING 2.5D CARTOON MODELS

BACKGROUND OF THE INVENTION

Cartoon-style drawing and animation have over time developed a rich language of non-photorealistic stylizations. The ability to rotate a two-dimensional (2D) cartoon and view it from any angle has many applications, both in aiding animation and in enabling cartoon objects to be placed in an interactive three-dimensional (3D) environment in which the user controls the viewpoint. Previously, this has been achieved by constructing a 3D model of the cartoon and rendering it in a non-photorealistic way so as to resemble a cartoon. However, generating a 3D model is time-consuming and may be processing intensive. In addition, many stylistic elements of 2D drawings cannot be adequately reproduced in a 3D model, as the 2D drawings may not correspond to any real 3D shapes.

Non-photorealistic rendering techniques have been proposed to make a 3D model resemble a hand-drawn cartoon, such as cel-shaded lighting or exaggerated, 2D silhouettes. However, rendering from a single 3D model cannot account for cartoons that have mutually inconsistent appearances in different views—for example, no matter the viewing angle, Bugs Bunny's ears are always facing the camera. View-dependent geometry addresses this limitation by providing multiple different models of an object, each associated with a single perspective, and rendering intermediate perspectives using a 3D model that is an interpolation of the models for nearby orientations. This approach, while more flexible, requires additional 3D modeling, and retains the essential 3D nature and appearance of the model.

Di Fiore et al. proposed an approach in which a set of hand-drawn views are interpolated to generate renderings at intermediate views in their 2001 paper, "Automatic In-betweening in Computer Assisted Animation by Exploiting 2.5D Modelling Techniques." In their approach, either a 3D skeleton must be manually created by the artist, or Z-ordering must be manually specified at each view. In the latter case, interpolation of shapes is simple linear interpolation. These limitations make di Fiore's approach unsuitable for generating a large number of rotated views of 2D cartoons.

Several methods have been proposed for the interpolation of 2D shapes, including solving the problem of vertex correspondence between two shapes by using a physically-based approach, in which strokes are likened to lengths of wire and a dynamic programming algorithm is used to minimize the amount of bending and stretching the wire undergoes in blending between two shapes. Other methods address the problem of vertex paths, by formulating as-rigid-as-possible shape interpolation, in which paths for vertices are found that keep the volume of the interior of the stroke at intermediate points as rigid as possible. Further methods introduced an as-rigid-as-possible approach to interactive shape manipulation.

While these interpolation methods are purely 2D, there is a form of 2D image interpolation, known as "View Morphing," that can mimic 3D rotations between two views. However, View Morphing's approach involves warping images where corresponding 2D points represent the same 3D point. In the case of cartoons, strokes often represent silhouettes of a shape, and corresponding 2D points therefore often do not represent a single 3D point.

Related work describes mapping 2D vector art "key frames" to positions in 3D, and allowing a user to explore the space of possible interpolations by manipulating a 3D point. The nearest keyframes to the 3D point are interpolated and the result is presented to the user. Alternative work limits the configuration space of interpolations between drawings to the subset that generates plausible images. The user manipulates the image to explore that subset of the state space without explicit knowledge of how the state space is laid out. Still other work introduces a new type of stroke for vector art which, amongst other things, can map different stroke lengths to different 2D drawings, which may be interpolated for intermediate lengths.

Several techniques aim to blend the distinction between 2D and 3D drawings. One approach includes drawing 2D strokes onto a plane in a 3D scene. These strokes are interpreted as indicating silhouettes or contours of 3D objects, and correspondingly deform and fade into and out of visibility as the camera rotates around the scene. Another approach uses 2D strokes that are again embedded in 3D space, but in this case they represent silhouettes of a shape and are explicitly associated with one another, so as the camera rotates, just the appropriate silhouette can be displayed.

Generating a new view of a cartoon may require determination of the strokes' Z-ordering in addition to the determination of the strokes' shapes. Several techniques have been proposed that seek to combine 2D drawings with depth information. One uses a new interface to determine Z-ordering of the strokes in a cartoon using sparse depth inequalities. Another layers elements in a flat image with local layering constraints, rather than global ones, effectively allowing depths that vary across the object. Reversing the challenge, a third automatically composes a 2D layered image from a 3D scene. Finally, a variety of sketch-based modeling approaches have been proposed, which aim to generate explicit 3D models from 2D drawings.

SUMMARY OF THE INVENTION

Embodiments of the present invention include a computer method, computer modeling apparatus, and computer program product for creating a rotated view of a 2D cartoon. When implementing an example method, an example apparatus obtains at least two key views of the 2D cartoon, e.g., through user input. Next, the example apparatus automatically determines a three-dimensional (3D) position of each of at least a subset of the strokes that make up the key views. The example apparatus translates at least some of the strokes by an amount dependent on a rotation angle of a desired rotated view before rendering the translated strokes according to the 3D positions to form the desired rotated view of the 2D cartoon.

Alternate embodiments include a computer-implemented method of rendering a rotated view of a subject 2D cartoon given at least two key views of the subject 2D cartoon. Each key view is formed of a plurality of strokes, each of which is defined in appearance to produce defined stroke appearances. Next, a respective position in 3D space is computed automatically and associated with each defined stroke appearance. A rotated view of the 2D cartoon rotated by a target rotation angle is formed automatically by calculating each stroke position and depth ordering as a function of (i) the computed 3D positions, and (ii) translation of at least a subset of the strokes by an amount dependent on the target rotation angle. The rotated view of the subject 2D cartoon is then rendered by rendering the strokes in the calculated depth order.

Compared to other approaches for rotating 2D cartoons, the inventive approach works entirely with 2D vector art (instead of 3D models). In addition, the inventive approach combines the defined silhouettes of a stroke from multiple views using translation and interpolation to generate a full silhouette in any view, unlike approaches that interpret strokes as silhouettes of 3D objects. The inventive approach also exploits the inferred depth ordering along with symmetries of the strokes' silhouettes to reduce the number of views that must be manually entered. These advantages make the inventive approach suitable for producing nonphotorealistic animation for movies, video games, and computer-based (e.g., Adobe® Flash®) animation.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1A shows vector art drawings of a 2D cartoon from different key views.

FIG. 1B shows a 2.5D cartoon model of the present invention that is generated automatically from the key views shown in FIG. 1A by associating each stroke with a 3D position.

FIG. 1C shows a rotated view of a 2D cartoon generated using the 2.5D cartoon model shown in FIG. 1B.

FIGS. 2A, 2B, and 2C show a 2.5D cartoon model being rotated through front, oblique, and side views, respectively, in embodiments of the present invention.

DETAILED DESCRIPTION OF THE INVENTION

Figure 3:
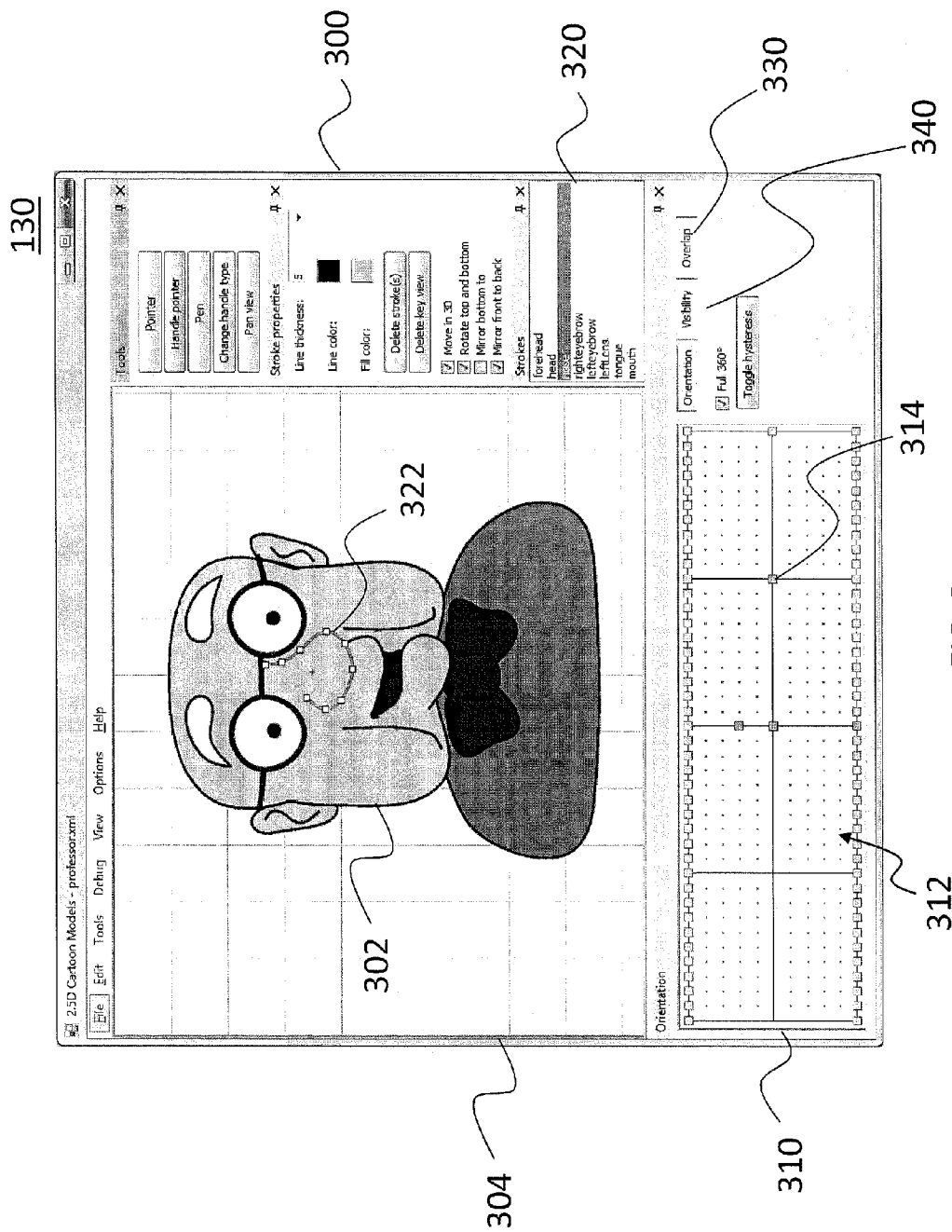
FIG. 3 is a schematic illustration of a main window of an interface for a computer modeling apparatus configured to generate rotated views of a 2D cartoon according to the present invention.

A description of example embodiments of the invention follows.

The teachings of all patents, published applications and references cited herein are incorporated by reference in their entirety.

Disclosed herein are examples of methods, apparatus, and computer program products capable of creating rotated views of 2D vector-art drawings, also called 2D cartoons, formed of multiple strokes by translating the strokes' positions based on inferred 3D positions while interpolating the strokes' shapes in 2D. In other words, the example embodiments involve mapping the vector-art drawings to different points in a 2D parameterization of an orientation space, and generating plausible interpolations across that orientation space. The 2D vector-art drawings are used to generate models which can be rotated in 3D. However, instead of using the vector-art drawings to generate a 3D polygonal mesh, the drawings are used to generate a 2.5D cartoon, which can have inconsistent appearances in different views and naturally supports a stylized appearance.

In one embodiment, an artist (user) manually specifies as input 2D drawings of a cartoon in different views. The manually specified views are called "key views" (similar to keyframes in timeline animation). The central challenge is to use these key views to determine a reasonable appearance for the cartoon in a rotated view. A naive approach would be to do simple 2D shape interpolation across the key views for each stroke. However, simple 2D interpolation is unable to capture the complex nature of the paths that strokes follows in a 3D rotation. These paths curve, and strokes proceed along them at varying speed. The Z-ordering of strokes also changes during rotation, as some strokes rotate to the front and others rotate to the back. Simple 2D interpolation ignores these effects, and is unable to produce convincing results for novel rotated views.

Instead of using 2D interpolation, the inventive approach uses 2.5D interpolation: interpolating 2D drawings while respecting the implicit 3D structure underlying the drawings to generate an interpolated view that resembles a rotation to an intermediate viewpoint. A hybrid structure, called a 2.5D cartoon model, facilitates rotation by associating 2D vector-art strokes with their respective 3D positions, or "anchor positions." In general, this structure can be conceptualized as a collection of billboards positioned in 3D space, with each billboard containing a single stroke of the cartoon.

A 2.5D cartoon modeler 81 (FIG. 8) of the present invention creates a 2.5D cartoon model by automatically determining a 3D position for each stroke, and using that 3D position to determine a depth-ordering (or Z-ordering) automatically (though the suggested Z-ordering can be overridden by the artist if desired). A cartoon rotation engine 83 (FIG. 8) then employs the 3D positions to translate the strokes along a nonlinear path and to determine their Z-ordering in rotated views. The cartoon rotation engine 83 combines the defined silhouettes of a stroke from multiple views using translation and interpolation to generate a full silhouette in any view. To simulate a rotation between known key views, the cartoon rotation engine 83 rotates the stroke positions in 3D about the origin, while interpolating the vector art of each stroke with simple 2D interpolation. Thus, the cartoon rotation engine 83 determines a stroke's shape by 2D interpolation across its key views and determine the stroke's position and Z-ordering are determined by its associated 3D anchor position.

In determining the appearance of a stroke in a new (rotated) view, three properties must be determined: the stroke's shape, position, and Z-ordering. These challenges can be separated and tackled with different tools. A stroke's shape changes in complex ways when viewed as the shifting contour of a 3D object, but can be approximated well by simple 2D interpolation. Meanwhile, strokes' positions and Z-ordering are essentially 3D properties, and while they change in complex ways when viewed in 2D, they can be easily modeled by the motion of a single 3D point.

FIG. 1A shows key views 102*a*, 102*b*, and 102*c* of a 2D cartoon from different angles. An artist specifies to the cartoon modeler 81 each the shape and position of each stroke in each key view using an interface. In this case, the key views 102*a*, 102*b*, and 102*c* are orthographic drawings of the cartoon projected onto the x-y, x-z, and y-z planes, respectively. When taken together, the key views form a basis set that can be used to determine the 3D positions of the strokes. Those skilled in the art will appreciate that the key views may be views of the cartoon from other angles, and that only two key views are necessary to compute the 3D positions of the strokes. Although two is the minimum number of key views necessary, certain pairs of key views ("pathological" key views) may not include enough information to determine the 3D position of every stroke. For example, left and right views of certain 2D cartoons may not provide the information needed to determine the Z-ordering of all the strokes that make up the cartoons. Preferably, the key views include at least two non-pathological key views (i.e., at least two non-degenerate key views) to ensure that the 3D position of each stroke can be estimated precisely.

FIG. 1B shows a 2.5D cartoon model 110 generated by the cartoon modeler 81 from the key views 102a-102c shown in FIG. 1A. The model 110 associates each stroke 112a-112c of the cartoon with a single 3D position, and is able to generate plausible renderings of the cartoon in new views by translating the strokes' positions in 3D, while interpolating their shapes in 2D. For example, the ear stroke 112a is positioned to the side of and behind the nose stroke 112b, which is ahead of and above the shoulder stroke 112c.

The 2.5D cartoon model 110 allows surprisingly believable rotations of cartoons, despite having no explicit 3D polygonal mesh of the object, and typically only requires three or four defined views 102a-102c of the cartoon to be able to generate plausible renderings of the cartoon in any orientation. In addition, each stroke's silhouette has an inherent symmetry that can be exploited to reduce the number of views that must be specified manually, allowing the artist to more easily construct models which can be fully rotated about all axes. In general, the silhouette of a 3D object has mirror symmetry about a plane normal to the view direction. This symmetry, coupled with depth ordering derived from the key views, can be used to automatically generate complementary views of the manually entered key views. For example, rotation engine 83 can use the silhouette of a front key view to create a complementary back key view.

FIG. 1C shows a rotated view 120 generated using the 2.5D cartoon model 110 of FIG. 1B. The rotated view 120 retains the 2D, hand-drawn nature of the input vector art 102a-102c, while supporting full 3D rotation. As described above, rotation engine 83 translates each stroke 112a-112c by an amount dependent on the rotation angle of the desired view. The rotation engine 83 interpolates the translated strokes 112a-112c and renders the interpolated strokes according to their depth ordering.

FIGS. 2A-2C show 2.5D cartoon models 200a-200c and rotated views 210a-210c of a cartoon face. The 2.5D cartoon models illustrate the 3D arrangement of strokes in each view, with crosses indicating the anchor positions of the strokes. In this example, the front view 200a and side view 200b were drawn by an artist, while the oblique view 200b was generated automatically by rotating the strokes' anchor positions (crosses) while interpolating the strokes' 2D shapes. For example, cross 202 indicates the 3D anchor position of face's left ear stroke 204. Rotating the cartoon to a new view results in translation of the 3D anchor positions and interpolation of the strokes.

Interface for Automatically Generating Rotated Views

FIG. 3 shows a user interface 300 of a computer-based modeling apparatus 130 (embodying the present invention) for automatically generating rotated views of a user-specified 2D cartoon. The user interface 300 resembles a traditional vector-art program, and enables a user to draw a cartoon using independent strokes (e.g., nose stroke 322). Unlike a traditional vector-art program, the user can at any time rotate the cartoon to edit a different view. When the user selects a new view, the interface 300 displays its best guess as what the cartoon looks like in that view. The user can then select and redraw some or all of the strokes of the cartoon to specify their appearance in that view, creating new key views for the strokes.

Typically, an artist starts by drawing a front view 302 of the cartoon in the interface's main window 304, and then selects and redraws the strokes in the side and top views. The artist can select individual strokes in the main window or with a stroke selection menu 320. In this example, the artist has selected the cartoon's nose stroke 322. Because a stroke must be selected before a new view for the stroke can be defined, the association between a stroke's appearances in different views is explicit.

Leveraging redundancies and symmetries across different views of a stroke usually makes it possible to generate plausible appearances for the cartoon in every view using just the top, front, and side views. Once these views have been drawn, the artist typically spends his or her time "browsing around" the orientation space using a view-angle control 310 below the main window 304 of the interface 300. If desired, the artist can adjust strokes that look wrong in certain views by changing the strokes in existing key views (denoted by heavy dots 314 in the orientation window 310), by redrawing the strokes in the view(s) in which they look wrong, which is the same as adding a new key view. Additionally, the artist may adjust the visibility or Z-ordering of strokes across different ranges of views using tools described below.

The artist can also easily animate a 2.5D cartoon model of the present invention using a provided animation timeline. The artist can enter the desired number of frames, select any frame, and redraw some or all of the strokes in the model. The result is that each stroke accumulates {time, orientation, shape} triples, which can be used to generate an animation that can be rotated around in 3D. Creating a 2.5D model is more involved than simply creating three 2D drawings, but is much less time-consuming than creating a 3D model.

The artist controls the current view using the view angle control 310, shown in the lower-left of FIG. 3. The view angle control 310 is simply a 2D grid which parameterizes the angle space, discretized into a lattice of clickable points 312. The viewpoints are discretized to make it easier to return to points 314 associated with previously specified key views. The angle space is parameterized such that the horizontal axis of the angle control grid corresponds to yaw (rotation about the Y-axis), while the vertical axis corresponds to pitch (rotation about the X-axis). Users are able to grasp this mapping quickly once shown the locations of the front, side, and top views.

Figure 4:
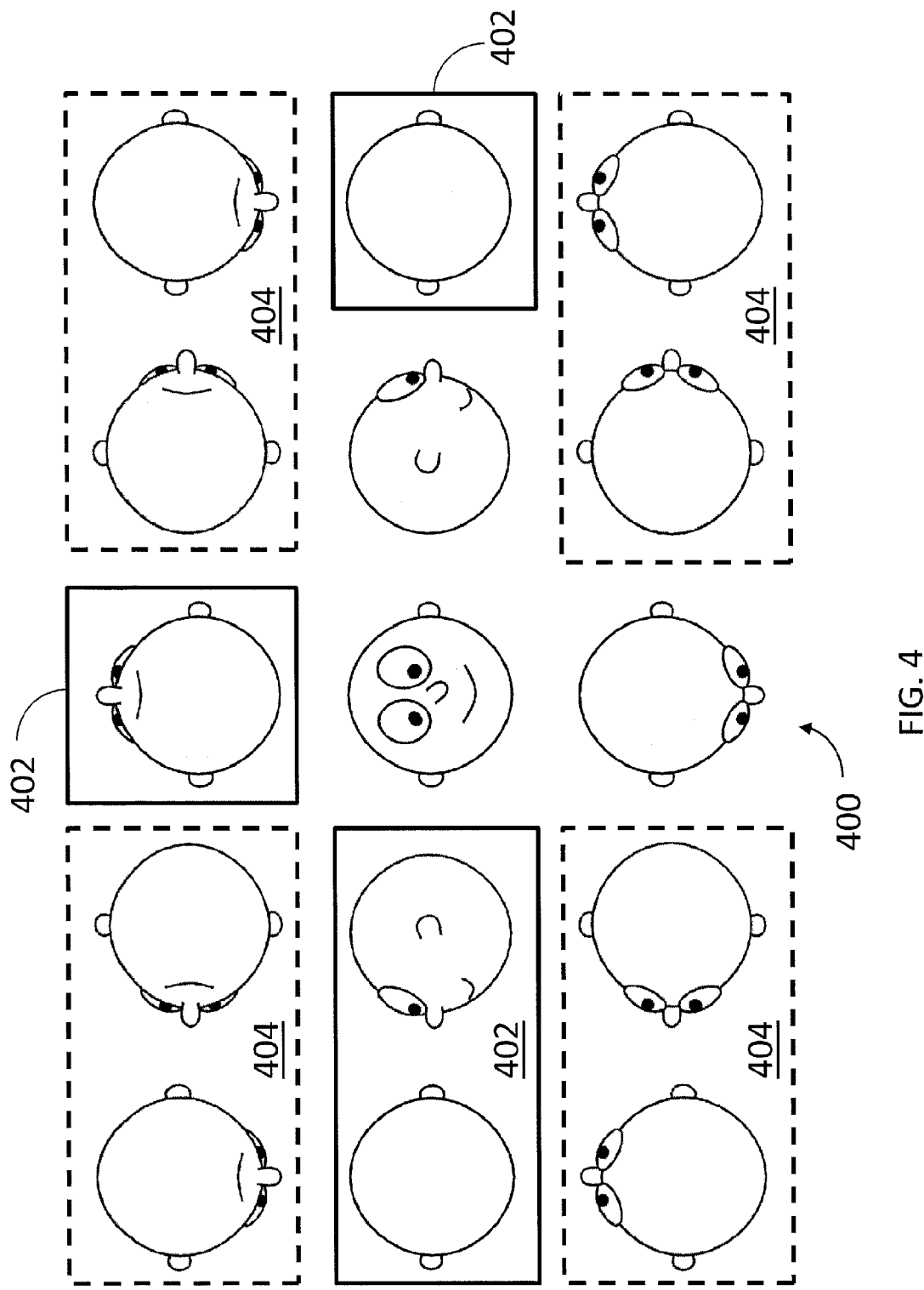
FIG. 4 shows an orientation space of possible views parameterized into yaw and pitch.

FIG. 4 is an illustration of rotated views in the parameterized angle space of the view angle control 310 shown in FIG. 3. The orientation space of FIG. 4 shows an possible views parameterized into yaw and pitch. Tilt is ignored because tilt can be accounted for with a screen-space rotation. Views 400 (without outlines) are key views drawn by the user. Views 402 (in boxes with solid lines) were automatically created by mirroring individual strokes, and views 404 (in boxes with dashed lines) were created automatically by rotating existing views.

Specifying Depth Ordering

In a traditional vector-art interface, the Z-ordering of strokes can be controlled by manually moving strokes forward and backward in a global ordering. In a 2.5D model, no such global ordering exists, as the Z-ordering changes depending on the viewing angle. In the inventive approach, once the artist draws two or more views for a stroke, the rotation engine 83 automatically calculates a 3D anchor position for the stroke. The rotation engine 83 then uses the 3D anchor positions to determine the strokes' Z-ordering. However, the artist may wish to override this suggested Z-ordering in order to maintain high-quality renderings for all views.

The interface 300 of FIG. 3 includes an overlap tool 330 that allows the artist to specify a constraint on the relative Z-ordering of two strokes over a given range of views. The artist places such a constraint by selecting two strokes, then clicking "Add>overlap region" or "Add<overlap region," and finally drawing a polygon onto the view angle control. The polygon defines the range of views for which the first selected stroke must either be above or below the second stroke, depending on the selected button.

The artist may add arbitrarily many of these overlap constraints, and can therefore completely control the Z-ordering in any view. For example, if Z ordering A>B>C>D is desired in a given view, the artist can enforce that A>B, B>C, and C>D using three separate overlap constraints that include that view. In practice, the Z-ordering based on strokes' anchor positions is generally correct for most strokes, although a small number of manually-specified overlap constraints may be necessary to provide plausible renderings of rotated views from every angle. The rotation engine 83 is responsive to user-specified constraints on overlap/depth ordering.

Setting Stroke Visibility and Combining Strokes

The interface 300 also includes a visibility tool 340 to allow the artist to manually specify a stroke's visibility for ranges of views. The visibility tool 340, similar to the overlap tool 330, allows the artist to draw a polygon directly onto the view angle control to specify a range of views. The artist may then specify that a particular stroke must be either visible or invisible for that range of views. Strokes are visible everywhere by default. The rotation engine 83 is responsive to these user-specified stroke settings.

With the visibility tool 340, an artist can also create complementary groups of strokes that represent the same part of the cartoon in different stylizations, such that only one group (one appearance) of the part is visible in any one view. This may be useful for designing heavily stylized shapes that must revert to simpler appearances when viewed from oblique angles.

Finally, an artist can also combine strokes using Boolean expressions. For example, to make a tongue stroke lie "within" a mouth stroke, the artist may first name each stroke, then select the tongue and set its Boolean expression to be "tongue ∩ mouth", which results in the tongue stroke displaying the intersection of the two strokes. Boolean operations are also useful in approximating highly concave shapes by combining multiple simple shapes into a single more complex one, as described below.

Performing 2.5D Interpolation

Figure 5B:
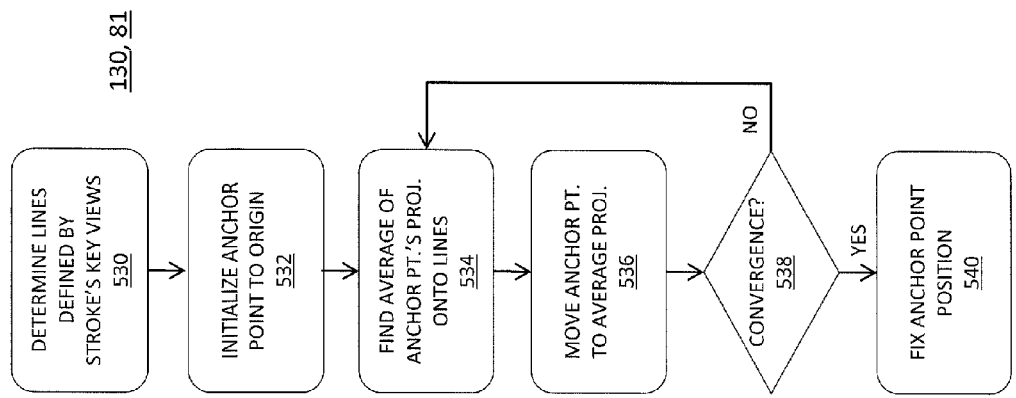
FIGS. 5A and 5B are flowcharts that illustrate shape interpolation and anchor position determination according to the present invention.
Figure 5A:
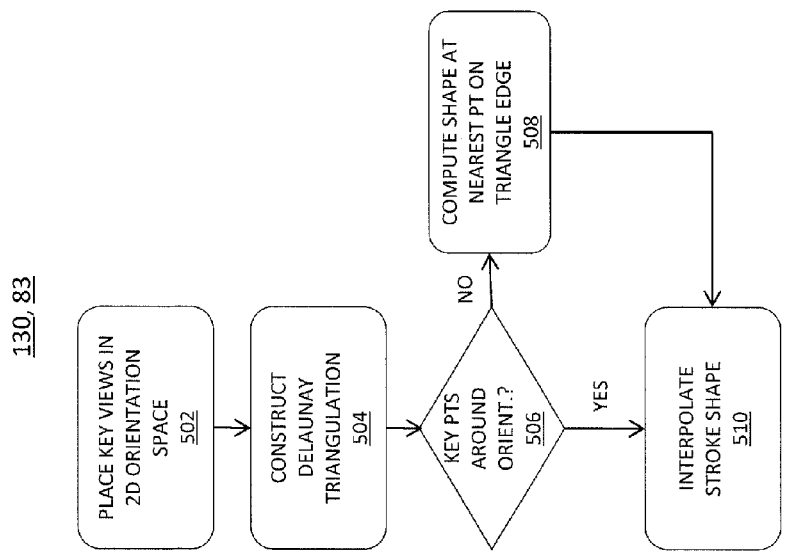

The inventive modeling apparatus 130/rotation engine 83 determines a stroke's shape (as independent from its position and Z-ordering) in a rotated view by interpolating the nearest key views, as illustrated in FIG. 5A. First, the apparatus places the key views into a 2D parameterization of the angle space (502), such as the space shown in FIG. 4. This yields a set of 2D points representing the defined key views. Next, the modeling apparatus 130 constructs a Delaunay triangulation of these points (504). A stroke's shape in a new (rotated) view is determined by performing 2D shape interpolation (510) across the vertices of the Delaunay triangle that contains the parameterization of the new view. If there are no key points surrounding the given parameterized orientation (506), the apparatus 130 finds the nearest point (508) on the nearest triangle edge and computes the shape at that orientation (510). Derived key views (described below) may be used to avoid situations where no key points surround the given parameterized orientation.

FIG. 5B illustrates how a modeling apparatus 130/modeler 81 anchors each stroke in a 2.5D model to a single 3D anchor position that determines the stroke's position and Z-ordering. Where a given stroke's anchor point should lie can be determined by considering the stroke's position in its key views. First, the apparatus 130 determines the line that passes from the center of the given stroke in the direction of the camera's viewing direction used to generate the particular key view for each key view (530). While the lines for the different key views typically do not intersect, a suitable anchor point is a point on a locus that defines the minimum distance to each of the lines. The apparatus 130 finds a suitable anchor points by initializing the anchor point to the origin (532), determining the average of the initialized point's projection onto the lines defined by the stroke's key views (534), then moving anchor point to the average of the point's projections (536). The apparatus 130 iterates through these steps until the anchor point converges to a stable position (538). Once the apparatus 130 has computed a stable anchor point, the apparatus fixes the stroke's anchor position (540).

Anchor position determination and strokes interpolation can be performed independently. In addition, position determination and strokes interpolation can be performed simultaneously or in any order, e.g., position determination followed by stroke interpolation or stroke interpolation followed by position determination.

Occasionally, a stroke's position will change across different views in a way that does not correspond to any real 3D position. For example, Bugs Bunny's ears always face the camera from any view. With such shapes, trying to match a 3D position to a stroke can be counter-productive. To avoid implausible renderings, each stroke may optionally have no associated anchor position, in which case it is rendered based on simple 2D interpolation across its key views.

Sometimes, several strokes in a cartoon together specify a single part of the object which must stay together as the camera rotates (e.g., the pupil and eye). If each stroke has its own anchor point, strokes which are drawn close together in every key view may nonetheless drift apart between them. To address this, the user can join a selection of strokes into a group. A set of grouped strokes move relative to a single 3D anchor point, which is simply the average of the anchor points of each of the component strokes.

Derived Key Views

Leveraging symmetries reduces the number of key views that must be manually drawn by the artist. To illustrate, consider the silhouettes of any object as viewed from the front and the back: the two silhouettes are simply horizontal mirror images of each other. Therefore, flipping a stroke's appearance in the front view yields the stroke's appearance in the back view. In general, any artist-specified key view for a stroke can be flipped to generate a derived (complementary) key view for the reverse orientation. The inventive apparatus and method (130 generally) insert these derived key views into the set of key views automatically to significantly reduce the number of key views that must be manually drawn by the artist. For instance, the views 402 in FIG. 4 are key views derived by flipping the manually entered key views 400.

Derived key views for reverse orientations can be used even if the cartoon as a whole is not a mirror image in a reversed orientation, as this is typically caused by different Z-orderings in the two views, and the Z-ordering of strokes is computed independently of their shape. The top and bottom views in FIG. 4 illustrate this case. However, the artist may wish to turn off derived key views for strokes which have inconsistent appearances across different views, such as the mouth in FIGS. 1A-1C.

The inventive apparatus and method 130 also use rotational symmetry about the view axis to automatically produce complementary views rotated about the view axis from a single manually entered key view. To see how, consider the faces in the top and bottoms rows of FIG. 4: each face can be created by rotating any other face in the same row about an axis normal to the plane of the page. In other words, rotating one view at a given pitch yields every other view at the same pitch. Therefore, when the artist specifies any key view, the inventive apparatus and method 130 automatically obtain derived key views for all other points for the same pitch value by rotating the manually specified view.

If a stroke is entirely symmetric about the vertical axis, we can simply mirror views of the stroke facing right (yaw>0) to obtain views of the stroke facing left (yaw<0). Flipping a view about the vertical (yaw) axis also works well for stylized shapes, such as the mouth in FIG. 1, that the artist wishes to "pop" from one orientation to another.

Limitations of 2.5D Interpolation

The nature of 2.5D cartoon models imposes limitations on the types of shapes that can be represented. Because cartoons are composed of strokes that are treated mostly independently, it is difficult to show interior contour or detail lines, as these are expected to merge with shape silhouettes at some point in rotation. In addition, shapes that are sharp or highly concave may interpolate poorly at intermediate views. Overlapping strokes can also suffer from undesired popping artifacts during rotation.

Sharp and highly concave shapes are the most difficult to represent as their contours change in complex ways during rotation that cannot be approximated with linear 2D interpolation. This issue can be addressed for some shapes by decomposing the shape into two or more mostly convex shapes, and then using Boolean union operations to combine them into what appears to be one stroke. Highly concave shapes, however, may be difficult to decompose in this fashion. Unfortunately, shapes intended as textures on the surface of a shape are especially difficult to interpolate, as they are essentially very thin concave shells. Hair, for example, may be difficult to render plausibly as hair generally falls over the head in a way that forms a concave shell. These limitations can be ameliorated by manually drawing more key views.

Popping artifacts arise when the artist draws two shapes that overlap at the moment their relative Z-ordering changes. While a certain amount of popping is actually expected in 2D cartoons, unintended popping artifacts can be distracting. However, only shapes that interpenetrate (in a 3D conception of the shapes) should have outlines that overlap at the moment that their relative Z-ordering changes. Popping can therefore be reduced by redrawing the strokes as non-interpenetrating shapes, so they do not overlap, or overlap as little as possible, in the views where Z-ordering changes.

Figure 6:
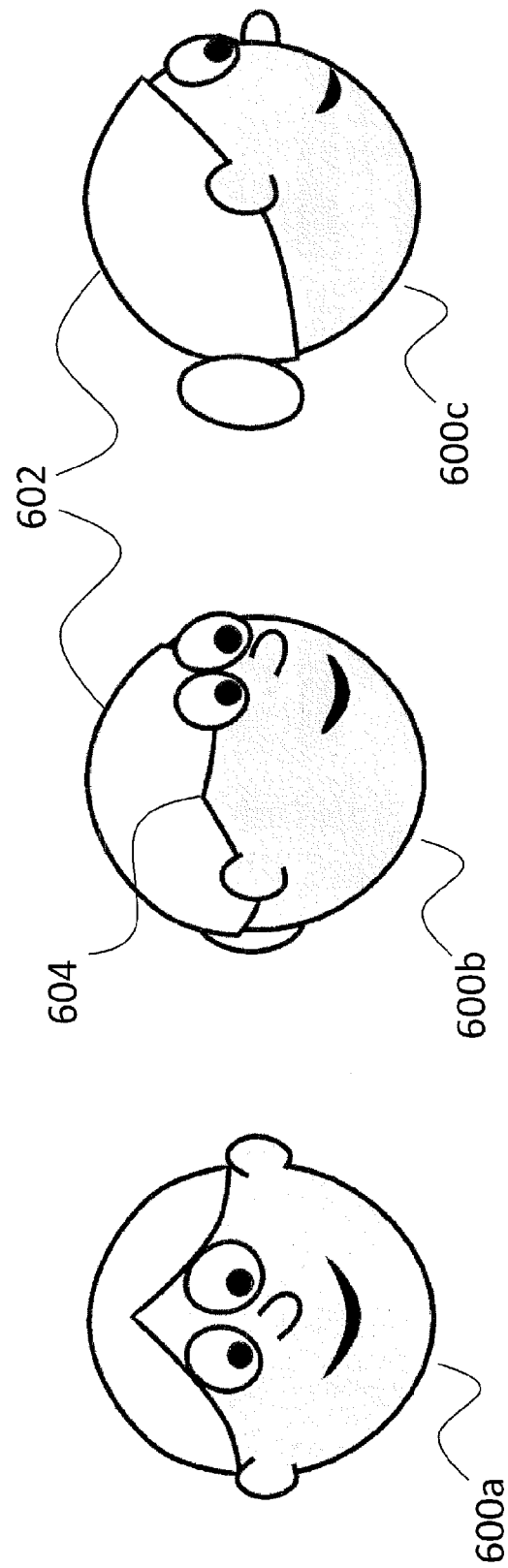
FIG. 6 shows key views (left and right) of a cartoon with a hair stroke that yields an implausible rotated view (middle).

FIG. 6 shows a failure case which a hair stroke 602 interpolates poorly. Key views 600a and 600c of the hair stroke 602 are reasonable, but a rotated view 600b shows the hair stroke 602 with a part 604 located between the right eye and the ear (rather than between the eyes). This implausibility results from the hair's highly concave shape and the head's partial occlusion of the hair. In reality, as the head rotates, part of the hair should disappear behind the head, while other parts rotate into view. Implausible rendering caused by concave shapes and partial occlusions can be addressed by more sophisticated shape interpolation and Z-ordering that supports partial occlusion. Alternatively, strokes with concave, occluded shapes, such as hair stroke 602, can be modeled with more key views and/or by decomposition into many subparts.

Figure 7:
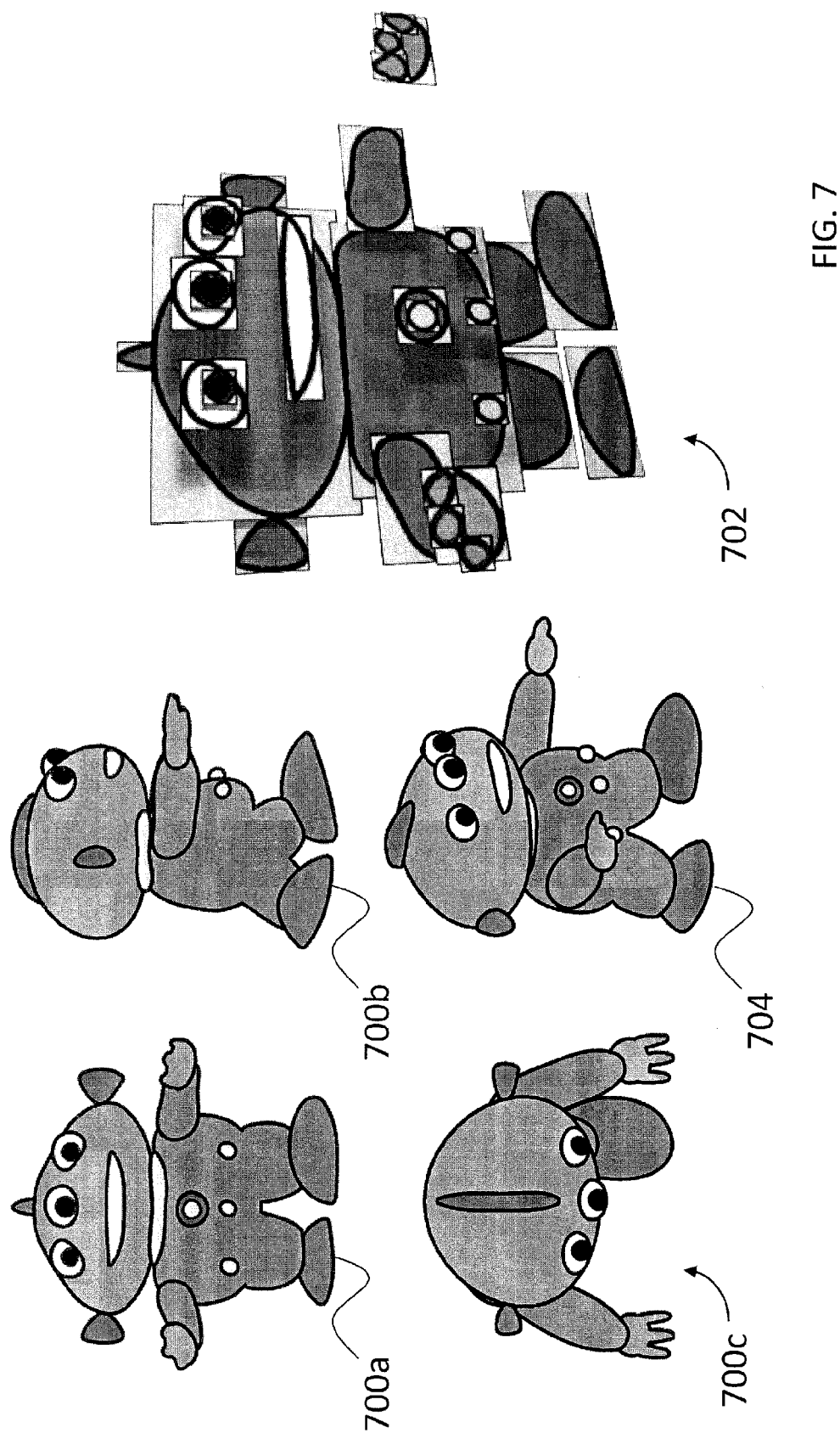
FIG. 7 shows key views, an exploded view of a 2.5D cartoon model, and an automatically generated rotated view of a cartoon alien in one embodiment of the present invention.

FIG. 7 shows key views 700a-700c, a 2.5D cartoon model 702, and a rotated view 704 of a cartoon alien generated by an embodiment having modeling apparatus 130, 2.5D cartoon modeler 81, and rotation engine 83 of the present invention. The key views 700a-700c provide enough information to allow the cartoon alien to be rendered in any view. Rendering itself, due to the simple nature of the calculations, is far faster than real time. FIG. 7 shows that 2.5D cartoon models are capable of rendering organic, stylized shapes such as faces, which can be difficult to render non-photorealistically. 2.5D models also support a wide range of stylized 2D drawing effects that do not reflect any real 3D shape, and therefore cannot be modeled directly with 3D mesh-based approaches, but which nonetheless play an important role in the language of 2D cartooning.

Animation, which is difficult in 3D, is much simpler in 2D. Facial animation, for example, has a well-developed set of styles and methods in the realm of 2D cartooning, which are difficult to translate to a 3D model. With 2.5D cartoons, these methods and styles can be used naturally, as an animator's desired appearance for a cartoon in a given frame can be drawn in directly, without having to consider what 3D shape would produce the same effect. The inventive cartoon rendering has a wide range of applications, including in interactive entertainment, animation, and rendering on non-3D-accelerated platforms such as cell phones and Flash applications. The ease of drawing in 2D also makes it suitable for use by non-professional users.

Figure 8:
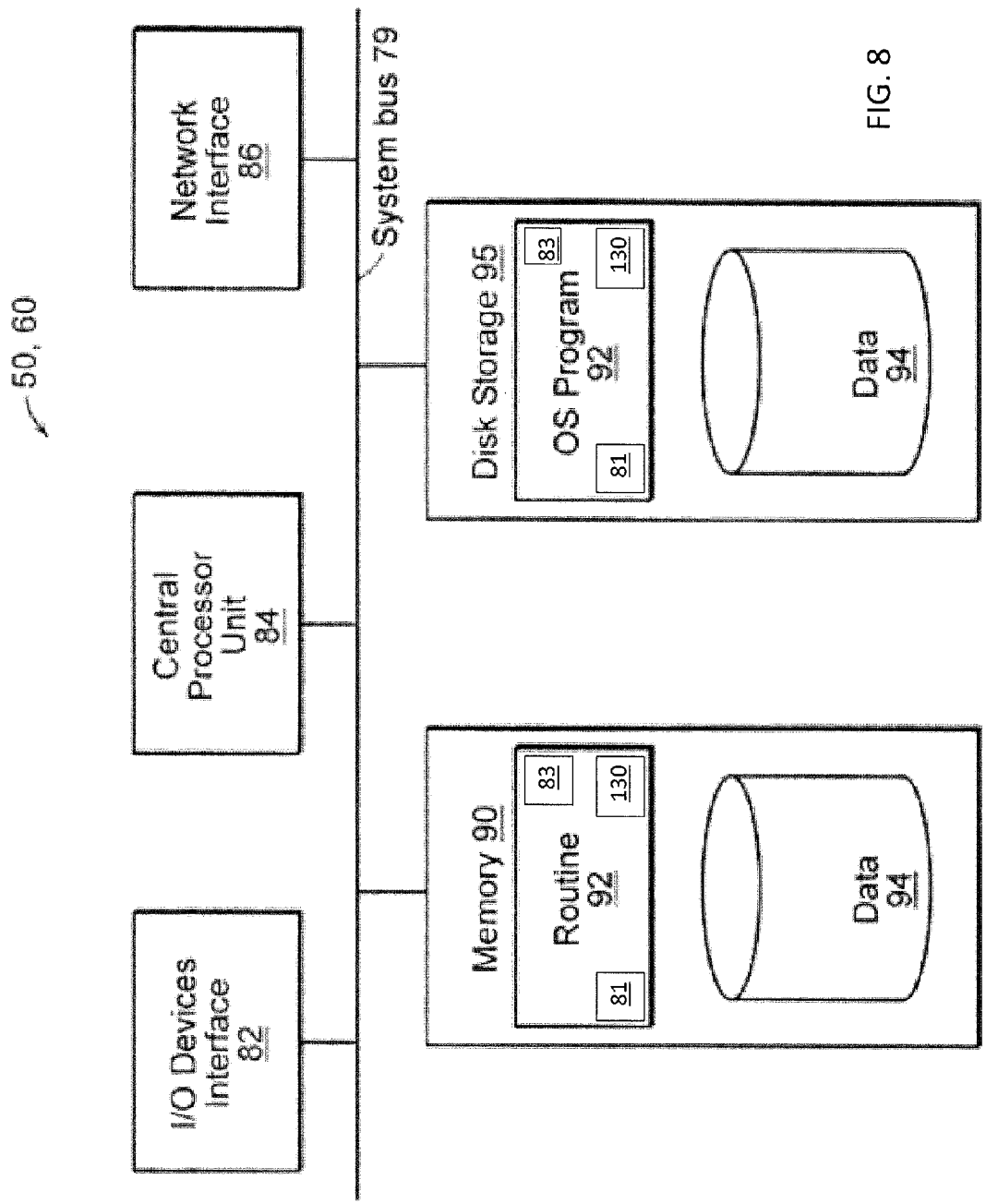
FIG. 8 is a block diagram of a computer implementation of one embodiment of the present invention, the computer executing the steps of the flowcharts of FIGS. 5A and 5B.

FIG. 8 illustrates a computer, in stand-alone configuration or configured in a computer network or similar digital processing environment in which the present invention may be implemented. The computer 50, 60 may be a client or server processor as follows.

Client computer(s)/devices 50 and server computer(s) 60 provide processing, storage, and input/output devices executing application programs and the like. Client computer(s)/devices 50 can also be linked through a communications network to other computing devices, including other client devices/processes 50 and server computer(s) 60. The communications network can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 8 is a diagram of the internal structure of the computer (e.g., client processor/device 50 or server computers 60). Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network. Memory 90 provides volatile storage for computer software instructions 92 and data 94 used to implement an embodiment of the present invention (e.g., modeling apparatus 130 including a 2.5D cartoon modeler 81, cartoon rotation engine 83, and supporting code, such as in FIGS. 5A and 5B detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to example embodiments thereof, it will be understood by those skilled in the art that various changes in form and details may be made therein without departing from the scope of the invention encompassed by the appended claims.

What is claimed is:

1. A computer method of creating a rotated view of a two-dimensional (2D) cartoon, the computer method comprising:
   obtaining, by a processor, at least two key views of the 2D cartoon, the 2D cartoon including a plurality of strokes;
   automatically determining, by a processor, a three-dimensional (3D) anchor position of each of at least a subset of strokes in the plurality of strokes by (i) calculating a line along a view direction through a center of the subset of strokes for each of the key views and (ii) determining the 3D anchor position based on a minimum distance between the center of the subset of strokes and each calculated lines associated with each of the key views;
   translating, by a processor, at least a subset of the plurality of strokes by an amount dependent on a rotation angle of a desired rotated view, said translating resulting in translated strokes; and
   rendering, by a processor, the translated strokes according to the 3D positions to form the desired rotated view of the 2D cartoon.

2. The computer method of claim 1 further including:
   interpolating respective shapes of at least a subset of the strokes based on the rotation angle, and wherein rendering the translated strokes includes rendering the interpolated shapes.

3. The computer method of claim 2 wherein interpolating respective shapes includes constructing a Delaunay triangulation of 2D points representing the key views.

4. The computer method of claim 1 further including:
   determining a depth ordering of at least a subset of the strokes based on the 3D positions.

5. The computer method of claim 1 further including:
   fixing the 3D position of a specified stroke regardless of rotation angle.

6. The computer method of claim 1 further including:
   enforcing a certain depth ordering for two or more strokes over a range of rotation angles.

7. A computer modeling apparatus comprising:
   an interface configured to enable a user to obtain at least two key views of a 2D cartoon that includes a plurality of strokes; and
   a processor operably coupled to the interface and configured to:
   (i) automatically determine a three-dimensional (3D) anchor position of each of at least a subset of strokes in the plurality of strokes by (i) calculating a line along a view direction through a center of the subset of strokes for each of the key views and (ii) determining the 3D anchor position based on a minimum distance between the center of the subset of strokes and each calculated lines associated with each of the key views;

(ii) translate at least a subset of the plurality of strokes by an amount dependent on a rotation angle of a rotated view to form translated strokes; and (iii) render the translated strokes according to the 3D positions to form the rotated view of the 2D cartoon in the interface.

8. The computer modeling apparatus of claim 7 wherein the processor is further configured to interpolate respective shapes of at least a subset of the strokes based the desired rotation angle, and to render the translated strokes using the interpolated shapes.

9. The computer modeling apparatus of claim 8 wherein the processor is configured to interpolate respective shapes by constructing a Delaunay triangulation of 2D points representing the key views.

10. The computer modeling apparatus of claim 7 wherein the processor is configured to determine a depth ordering of at least a subset of the strokes based on the 3D positions.

11. The computer modeling apparatus of claim 7 wherein the interface is further configured to enable the user to fix the 3D position of a specified stroke regardless of rotation angle.

12. The computer modeling apparatus of claim 7 wherein the interface is further configured to enable the user to enforce a certain depth ordering for two or more strokes over a range of rotation angles.

13. The computer modeling apparatus of claim 7 wherein the interface is included in a computer-based cartoon generation system.

14. A non-transitory computer program product comprising a non-transitory computer readable storage medium having a computer readable program, wherein the computer readable program when executed on a computer causes a computer to:

(i) obtain at least two key views of the 2D cartoon, the 2D cartoon including a plurality of strokes;

(ii) automatically determine a three-dimensional (3D) anchor position of each of at least of a subset of strokes in the plurality of strokes by (i) calculating a line along a view direction through a center of the subset of strokes for each of the key views and (ii) determining the 3D anchor position based on a minimum distance between the center of the subset of strokes and each calculated lines associated with each of the key views;

(iii) translate at least a subset of the plurality of strokes by an amount dependent on a rotation angle of a rotated view to form translated strokes; and (iv) render the translated strokes according to the depth ordering to form the rotated view of the 2D cartoon.

15. The non-transitory computer program product of claim 14 wherein the computer readable program when executed on the computer further causes the computer to interpolate respective shapes of at least a subset of the strokes based the desired rotation angle, and to render the translated strokes using the interpolated shapes.

16. The non-transitory computer program product of claim 15 wherein the computer readable program when executed on the computer causes the computer to interpolate respective shapes by constructing a Delaunay triangulation of 2D points representing the key views.

17. The non-transitory computer program product of claim 14 wherein the computer readable program when executed on the computer causes the computer to automatically determine a depth ordering of at least a subset of the strokes based on the 3D positions.

18. The non-transitory computer program product of claim 14 wherein the computer readable program when executed on the computer further causes the computer to enable the user to fix the 3D position of a specified stroke regardless of rotation angle.

19. The non-transitory computer program product of claim 14 wherein the computer readable program when executed on the computer further causes the computer to enable the user to specify a certain depth ordering for two or more strokes over a given range of rotation angles.

20. A computer-implemented method of rendering a rotated view of a two-dimensional (2D) cartoon, comprising:

given at least two key views of a subject 2D cartoon, the 2D cartoon being formed of a plurality of strokes, for each stroke, defining, by a processor, an appearance of the stroke in each of the key views, said defining resulting in defined stroke appearances;

automatically computing and associating, by a processor, a respective three-dimensional (3D) anchor position in a three-dimensional (3D) space for each defined stroke appearance by (i) calculating a line along a view direction through a center of the plurality of strokes for each of the key views and (ii) determining the 3D anchor position based on a minimum distance between the center of the subset of strokes and each calculated lines associated with each of the key views;

automatically forming, by a processor, a rotated view of the 2D cartoon rotated by a target rotation angle, said forming calculating each stroke position and depth ordering as a function of (i) the computed 3D positions, and (ii) translation of at least a subset of the strokes by an amount dependent on the target rotation angle; and rendering, by a processor. the formed rotated view of the 2D cartoon including rendering the strokes in the calculated depth order.

* * * * *